United States Patent [19]

Austin, Jr.

[11] Patent Number: 4,652,035
[45] Date of Patent: Mar. 24, 1987

[54] TAILGATE CONSTRUCTION

[75] Inventor: Lawthan M. Austin, Jr., Portland, Oreg.

[73] Assignee: Energy Counselors, Inc., Beaverton, Oreg.

[21] Appl. No.: 839,618

[22] Filed: Mar. 14, 1986

[51] Int. Cl.⁴ .............................................. B62D 35/00
[52] U.S. Cl. ..................................... 296/1 S; 296/56; 296/57 R
[58] Field of Search ........................ 296/1 S, 56, 57 R

[56] References Cited

U.S. PATENT DOCUMENTS 4,475,759 10/1984 Wine ..................................... 296/1 S
4,585,265 4/1986 Mader ................................... 296/1 S

*Primary Examiner*—Robert R. Song
*Attorney, Agent, or Firm*—Robert L. Harrington

[57] ABSTRACT

A tailgate construction wherein the hinge connections of a truck box are replaced with arms provided for pivoting of the tailgate between the conventional lower position and upper raised position above the truck box bed. The latch pin connections are moved from the truck box sides to a carriage member that is guided on the truck box sides between a first position with a latch pin positioned for normal closing of the tailgate, and a raised forward position. An interlock mechanism permits the user to lock and unlock the carriage in its's two positions. When unlocked and with the tailgate closed, the tailgate can be raised as permitted by the pivoting arms and guided carriage plate, to position the tailgate in a horizontal position over the truck bed.

7 Claims, 6 Drawing Figures

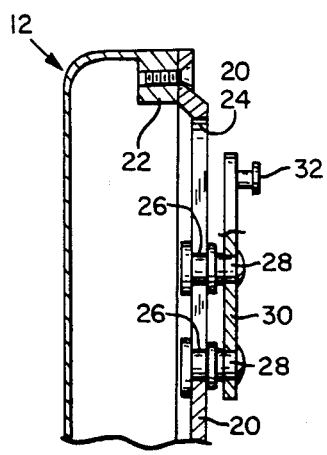
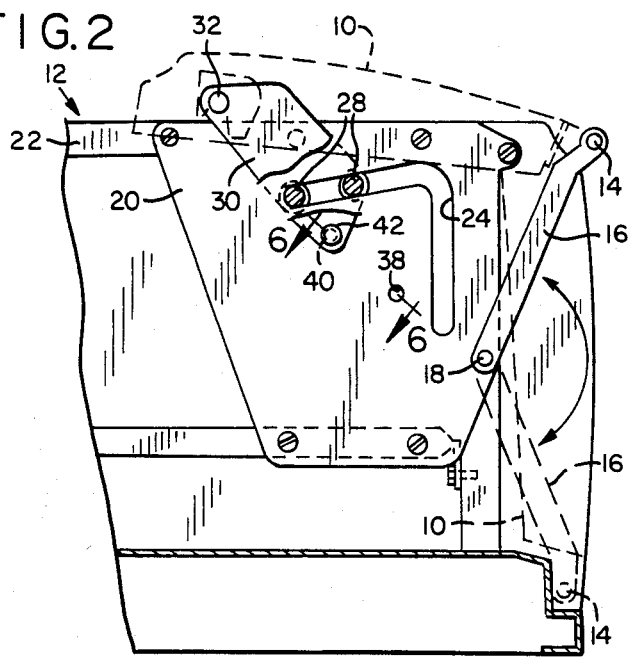
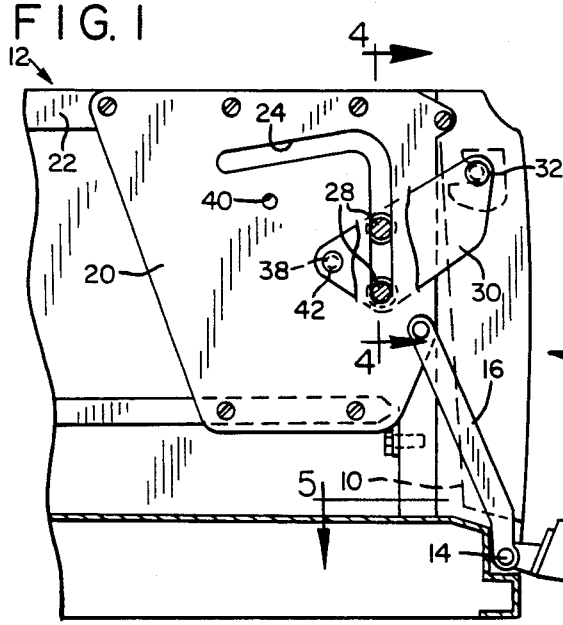
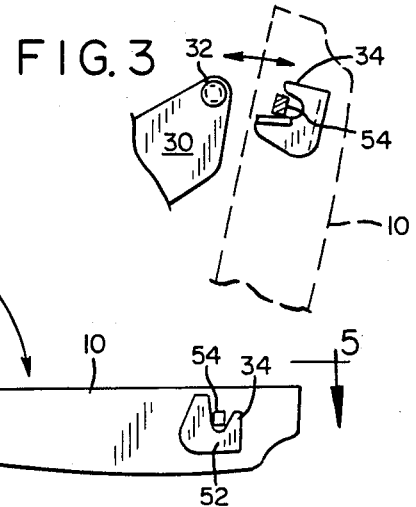
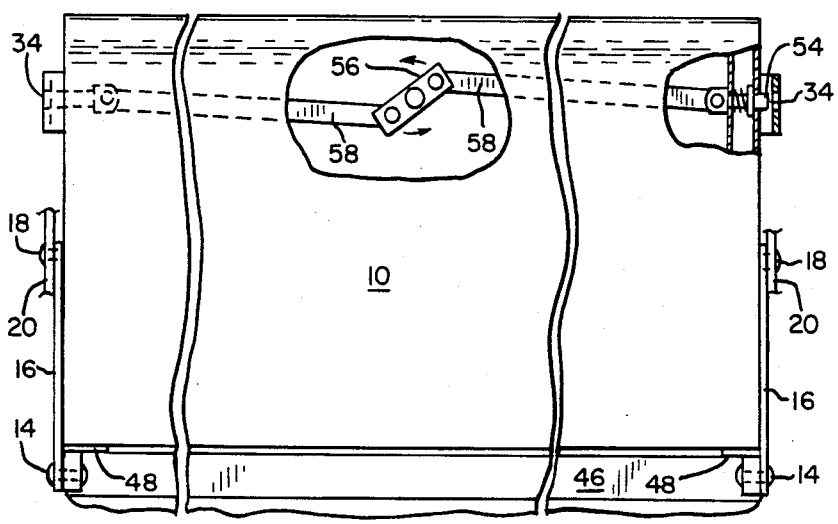
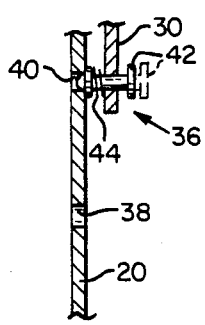

TAILGATE CONSTRUCTION

FIELD OF INVENTION

This invention relates to a tailgate construction for truck boxes or trailers, and more particularly to a mechanism that allows for the folding of the tailgate to a position that minimizes wind resistance.

BACKGROUND OF INVENTION

Truck boxes or trailers are commonly equipped with rear end walls referred to as tailgates. The tailgate is mounted on hinges at it's bottom edge and latched at the top edge in a manner that allows the tailgate to be unlatched and folded down to accommodate loading. When the truck box is empty, there is no need to close the tailgate except that in the opened position it is readily damaged. Thus it is most common to have the tailgate closed except when loading or unloading.

A very high percentage of the miles traveled by many trucks is with the truck box empty (most notably pickup trucks which are often used principally as transportation vehicles and only occasionally for hauling). Whereas the truck cab is readily designed to minimize wind resistance during high speed travel (thereby saving on fuel consumption) the truck box is designed to maximize the loading capacity and is substantially a rectangular box. The tailgate in the closed position presents a flat surface to the airflow and thus a substantial resistance. It functions to resist forward travel of the vehicle with a resulting increase in fuel consumption.

BRIEF DESCRIPTION OF INVENTION

The present invention provides a mechanism that allows the tailgate to be folded down for loading and closed for hauling in a conventional manner. However, it also provides for a third position with the tailgate positioned horizontally and substantially inside the truck box. It is "out of the way" and thus not likely damaged (or to cause damage). Only the edge surface of the tailgate is directed into the onrushing air flow to thereby minimize wind resistance.

In the preferred embodiment, a special tailgate mounting mechanism is provided including a pair of mounting plates affixed to the truck box sides. A guide slot in each plate guides the sliding movement of a secondary or carriage plate between a lower rear position and an upper forward position. A pair of arms are each pivotally attached at one end to a mounting plate for pivoting of the opposite end between a rear lower position and a rear upper position. The opposite ends of the arms are pivotally attached to the bottom edge of the tailgate (replacing the bottom edge hinges). The carriage members carry latch pins that accommodate the latches on the upper portions of the tailgate (said latch pins replacing the latch pins normally mounted on the truck box sides.) The carriage plates and arms are normally locked in position during loading and hauling. When empty, the mechanism is unlocked and the tailgate can then be raised. The upper portion of the tailgate is guided in it's movement by the carriage plates to a position forwardly over the truck bed. The arms control the lower edge movement of the tailgate to guide the lower portion of the tailgate to an upper position. The tailgate is thus essentially in a horizontal position where wind resistance is minimized.

DETAILED DESCRIPTION AND DRAWINGS

The invention and the advantages provided thereby will be more fully appreciated by reference to the following detailed description. The drawings which are referred to are briefly described:

FIG. 1 is a side view in section of a truck box with a tailgate mechanism incorporating the present invention;

FIG. 2 is a view similar to FIG. 1 but showing the tailgate structure in a position for traveling;

FIG. 3 is an enlarged partial view of a latch mechanism provided for the tailgate of FIGS. 1 and 2;

FIG. 4 is an enlarged view of the carriage plate taken on view lines 4—4 of FIG. 1;

FIG. 5 is a view of the tailgate as taken on view lines 5—5 of FIG. 1; and

FIG. 6 is a view of the interlock mechanism as taken on view lines 6-13 6 of FIG. 2.

FIGS. 1 and 2 illustrate a tailgate 10 in it's various positions as permitted by the tailgate structure of the present invention. As shown in solid lines in FIG. 1, the tailgate 10 is folded from the top down and into it's open position, ready for loading. The dash line position of FIG. 1 illustrates the tailgate in a closed position, e.g., with the truck box 12 loaded and ready for hauling. FIG. 2 shows the tailgate 10 in dash lines in a spoiler position, i.e., rolled up over the top of the truck bed into a near horizontal position where wind resistance is minimized.

The tailgate 10 is pivotally connected by pins 14, at positions adjacent the bottom of the side edges of the tailgate 10, to the ends of arms 16 (located one on each side of the tailgate 10). Arms 16 are pivotally connected at the other end by pins 18 to a plate 20 that is fastened (e.g., by bolts) to the respective sides of the truck box 12, (one side only is shown in FIGS. 1 and 2 but it will be understood that the opposite side is the mirror image thereof).

Plate 20 is provided with a slot 24 that is configured to define a specific guide path for a pair of spaced guide bearings 26 (see also FIG. 4). Mounting pins 28 journaled in bearings 26 are attached to a carriage plate 39. The carriage plate 30, through the mounting pins 28, is permitted limited sliding movement relative to plate 20, as dictated by slot 24.

Refer now also to FIG. 3. The carriage plate 30 carries a latch pin 32 that is adapted to engage the latch 34 that is mounted adjacent the top edge of the tailgate 10 (one on each side of the top edge). As shown in FIG. 1, the carriage plate 30 is in it's lower rear position, i.e., bearings 26 and pins 28 are at the rear lower most position in slot 24. In this position, the latch pins 32 are positioned to be engaged by latch 32 at the upper edge of tailgate 10 for opening and closing, e.g. for loading and hauling.

Reference is now made to FIG. 6 as well as FIGS. 1 and 2 for an understanding of the locking mechanism 36 (for locking the tailgate into the load-haul positions). FIG. 6 is a cross section of the mounting plate 20 and carriage plate 30 as taken on view lines 6—6 of FIG. 2. Provided in the plate 20 is an interlock hole 38 for the lower position of carriage plate 30, and hole 40 for the raised position of carriage plate 30. In FIGS. 2 and 6, the carriage plate 30 is in the raised position. A pinion 42 is slidable through carriage plate 30 and is projected into interlock opening 40. A spring 44 biases the pinion 42 to it's engaged position and prevents movement of the carriage plate 30.

It will be apparent that the pinion can be manually withdrawn from the plate 20 as shown in dash lines in FIG. 6 to permit sliding of the carriage plate 30 as permitted by the bearings 26 and pins 28. Movement of the carriage plate 30 to the lower position of FIG. 1 will align the pinion 42 with interlock opening 38, and spring 44 will bias the pinion into opening 38 to interlock the carriage plate in said lower position. It will be appreciated that, with the carriage plate 30 locked relative to the mounting plate 20, pins 18 of arms 16 are also locked in place to restrict the tailgate to the load-haul positions.

OPERATION

The operation of the structure should now be apparent. In the position of FIG. 1, carriage plate 30 is locked in the rear or lower position. In this position latch pin 32 is positioned to function in the conventional manner, i.e., it is fixed in place and aligned for engagement by the latch 34 of the tailgate 10.

The arms 16 are projected downwardly to their lower position by the weight of the tailgate and are limited in movement by engagement of the bottom edge of the tailgate with the rear edge of the bed 46 of the truck box 22. It is preferable that elastomeric bumpers 48 be provided on the edge of bed 46 to absorb the shock of the folding tailgate 10 (see FIG. 5). The pins 14 permit the tailgate 10 to pivot relative to arms 16 and thereby permits the conventional opening and closing movement of the tailgate as indicated by the arcuate arrow in FIG. 1.

The latching mechanism for the tailgate is illustrated in FIG. 3 and includes the C shaped latch 34 and lock pin 54. When the tailgate is closed, the latch 34 nests over pin 32, which triggers the latching mechanism i.e. pin 54 traps pin 32 in the latch 34. FIG. 5 illustrates the central release lever 56 that is connected by arms 58 to the lock pins 54 of latches 34. Turning of release lever 56 withdraws the lock pins 54 on both sides of the tailgate and permits opening of tailgate 10. The lock pins 54 remain unlocked until the tailgate is again closed where engagement of the pin 32 triggers the locking motion of pin 54. The details of the locking mechanism 34 are only briefly described herein as such mechanism is well known. The difference herein being that the companion pin 32 is mounted on a moveable plate 30 rather than on the sides of the truck box.

When the hauling, loading, and unloading functions are concluded, the driver will then be concerned with the wind resistance of the tailgate. He will first close the tailgate (if not already closed). He then releases the interlock pinion 42 and raises the tailgate. The upper edge of the tailgate, as dictated by the pivotal connection of pin 32 with the sliding carriage plate 30, will follow a path that is first a straight upward movement until upper bearing 26 reaches the curve of slot 24. It is then directed forward to the position shown in FIG. 2. The bottom edge of the tailgate 10 simply follows a curved path as dictated by pivoting arms 16 pivoted from the lower position of FIG. 1 to the raised position of FIG. 2. The tailgate is then essentially in a horizontal position and air flows over and under the tailgate. Pinion 42 is biased into the lock position of FIG. 6 and the driver can then drive the truck with assurance that the tailgate is fixed in the preferred position of minimum wind resistance.

Whereas the design as described above can be readily incorporated into the original truck design, a major advantage contemplated for the invention is the easy conversion of existing truck boxes to the improved design. An existing pickup, for example, will include a tailgate with a latch mechanism 34 and hinges along the bottom edge (although in some models the hinge may have to be moved from a central position to the side edges). The major design change is the removal of the lower hinges and upper latch pins from the truck box and mounting the plates 20 to the truck box sides. In order to properly align the arms 16 and carriage plate 30 of the plates 20, with the corresponding hinges and latches of the tailgates, some cutting and welding of the truck box sides may be required. However, experience has shown that such modifications are readily accomplished, and with some care, the finished product is both attractive and functional.

Having thus explained a preferred embodiment of the invention, those skilled in the art will conceive of further modifications and improvements while utilizing the basic concept disclosed herein. For example, both guide functions may be provided by guide arms, or both by guide plates. Thus it is to be understood that the concept in general, as encompassed by the inventions, is specifically defined in the claims appended hereto.

I claim:

1. A truck box for truck type vehicles comprising, a truck bed, side walls and a tailgate having top and bottom edge portions, a hinge connection connecting the lower edge portion of the tailgate to the truck bed, and a latch mechanism for releasably connecting the upper edge portion of the tailgate to the side walls, and the improvement which comprises;

a first guide means having a first guide member movably mounted on a sidewall of the truck bed between first and second positions, a latch connection of said latch mechanism mounted to the guide member for controlled movement between said first and second positions, a second guide means having a second guide member pivotally mounted at one end thereof to the side wall of the truck bed and the other end thereof pivotally connected to the lower edge portion of the tailgate, thereby providing said hinge connection between said tailgate and truck bed, and said hinge connection thereby provided with controlled movement between first and second positions, said first and second guide members arranged for cooperative guided movement of said latch connection and hinge connection for shifting of the tailgate when latched to the latch connection between an essentially vertical position for closing the back end of the truck box, and an essentially horizontal position forwardly of the back end of the truck box, and releasable locking means for locking the tailgate at said vertical and horizontal positions.

2. A tailgate construction comprising; a rectangular tailgate having upper and lower edge portions and side edge portions, a hinge connection at the lower edge portion, and a latch mechanism at the upper edge portion, and the improvement which comprises;

a mounting plate to be mounted to the side of a truck box, a guideway in said mounting plate, a carriage plate captured in said guideway and guided thereby between a rear lower position and an upper forward position, and a latch pin carried by said carrier plate adapted for interengagement with the latch mechanism of the tailgate, an arm pivotally mounted at one end to the mounting plate and adapted to be pivoted between a lower rear position and an upper rear position, said arm being pivotally connected at the other end to the hinge connection of the tailgate, said carriage plate and arm cooperatively controlling the position of the tailgate whereby in the rear lower position of each, the tailgate can be opened and closed in the conventional manner, and whereby in the closed position, the tailgate can be raised and re-positioned over the truck box as permitted by the movement of the carriage plate in the guideway of the mounting plate, and the pivoting upwardly of the arm.

3. A tailgate construction as defined in claim 2 wherein a mounting plate is provided for mounting on each of the truck box sides, with the pairs of carriage plates and arms cooperating to control movement of the tailgate.

4. A tailgate construction as defined in claim 3 wherein the guideway is a guide slot, a pair of guide pins from the carriage plate are captured in the guide slot to dictate movement and orientation of the carriage plate relative to the mounting plate.

5. A tailgate construction as defined in claim 4 wherein an interlock mechanism interlocks the carriage plate and mounting plate in the respective upper forward and lower rear positions.

6. A tailgate construction as defined in claim 5 wherein said interlock mechanism comprises a pinion carried by the carriage plate and slidable toward and away from said mounting plate, and interlock holes in said mounting plate positioned to receive said pinion with the carriage plate positioned in it's respective raised and lower positions.

7. A method of converting a conventional tailgate mounted on a truck box with truck box sides, said tailgate having open and closed positions wherein the tailgate is hinged at the bottom edge portion to the truck box and having a latch mechanism at it's upper edge portion adapted to engage latch pins on the truck box sides, comprising;

removing the hinge and the latch pins from the truck box, providing a pair of carriage plates each with a latch pin and a guide member, and further providing a pair of arms, each with a hinge connection, providing a guideway on each of the truck box sides for the carriage plate guide members to control movement thereof between first and second guideway positions, providing a pivotal connection for the arms on the truck box sides for pivoting of the arms between first and second positions, and mounting the tailgate hinge to the free ends of the arms for pivoting the tailgate between open and closed positions whereat the latch mechanism engages the latch pin of the carriage plates, and in said closed position, providing for the raising of the tailgate as permitted by the carrier plate movement in the guideways and pivoting of the arms.

* * * * *